United States Patent
Foti

(10) Patent No.: US 9,560,162 B2
(45) Date of Patent: Jan. 31, 2017

(54) QUALITY OF SERVICE SUPPORT FOR MACHINE-TO-MACHINE APPLICATIONS INCLUDING E-HEALTH

(71) Applicant: George Foti, Dollard des Ormeaux (CA)

(72) Inventor: George Foti, Dollard des Ormeaux (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 576 days.

(21) Appl. No.: 13/859,241

(22) Filed: Apr. 9, 2013

(65) Prior Publication Data

US 2013/0297744 A1 Nov. 7, 2013

Related U.S. Application Data

(60) Provisional application No. 61/621,645, filed on Apr. 9, 2012, provisional application No. 61/698,929, filed on Sep. 10, 2012.

(51) Int. Cl.

| | | |
|---|---|---|
| *G06F 15/16* | (2006.01) | |
| *H04L 29/08* | (2006.01) | |
| *H04L 29/06* | (2006.01) | |
| *H04W 12/02* | (2009.01) | |
| *H04W 4/00* | (2009.01) | |
| *H04W 76/02* | (2009.01) | |

(52) U.S. Cl.
CPC ......... *H04L 67/327* (2013.01); *H04L 63/0281* (2013.01); *H04W 12/02* (2013.01); *H04L 63/0407* (2013.01); *H04W 4/005* (2013.01); *H04W 76/022* (2013.01)

(58) Field of Classification Search
CPC .................................................. H04W 4/005
USPC ........................................................ 709/228
See application file for complete search history.

(56) References Cited

U.S. PATENT DOCUMENTS

| | | | | |
|---|---|---|---|---|
| 7,333,990 | B1* | 2/2008 | Thiagarajan | ........ H04L 63/0281 |
| 2002/0120749 | A1* | 8/2002 | Widegren | ............... H04L 12/14 |
| | | | | 709/227 |
| 2004/0085949 | A1* | 5/2004 | Partanen | ............. H04L 12/5695 |
| | | | | 370/352 |
| 2006/0149845 | A1* | 7/2006 | Malin | ................... H04L 67/322 |
| | | | | 709/228 |
| 2007/0147244 | A1 | 6/2007 | Rasanen | |
| 2010/0195562 | A1* | 8/2010 | Ishizu | ................... H04W 48/18 |
| | | | | 370/315 |
| 2012/0166659 | A1* | 6/2012 | Hjelm | ................... H04L 47/781 |
| | | | | 709/228 |
| 2012/0302229 | A1* | 11/2012 | Ronneke | ........... H04L 29/12754 |
| | | | | 455/422.1 |
| 2012/0307764 | A1* | 12/2012 | Zhao | ................... H04W 76/022 |
| | | | | 370/329 |
| 2013/0044646 | A1* | 2/2013 | Qu | ...................... H04M 15/765 |
| | | | | 370/259 |

(Continued)

FOREIGN PATENT DOCUMENTS

WO 2011/098150 A1 8/2011

OTHER PUBLICATIONS

3GPP Ts 23.207 V10.0.0, 3rd Generation Partnership Project; Technical Specification Group Services and System Aspects; End-to-end Quality of Service (QoS) concept and architecture (Release 10), Mar. 2011, pp. 1-39.

(Continued)

*Primary Examiner* — Aftab N. Khan
(74) *Attorney, Agent, or Firm* — Alex Nicolaescu; Ericsson Canada Inc.

(57) ABSTRACT

Quality of Service functionality is provided for Machine to machine device communications that allows a single IMS session to support a plurality of different data streams. In one embodiment a single IMS session is used to support a plurality of different data streams that arise from a single application type, while in another embodiment, a single IMS session is used to support a plurality of different data streams across a plurality of different devices and applications. Through the use of a single IMS session, signaling is reduced and QoS can be offered without impacting a large number of nodes. An IMS User Agent is deployed to aid in providing this functionality.

9 Claims, 14 Drawing Sheets

(56) References Cited

U.S. PATENT DOCUMENTS

| | | | |
|---|---|---|---|
| 2013/0170502 A1* | 7/2013 | Chen | H04L 63/0272 370/401 |
| 2013/0329653 A1* | 12/2013 | Russell, Jr. | H04W 4/005 370/329 |
| 2015/0131657 A1* | 5/2015 | Oyman | H04W 56/00 370/390 |

OTHER PUBLICATIONS

International Search Report from corresponding application PCT/IB2013/052829.

3GPP TS 23.218 V11.2.0, 3rd Generation Partnership Project; Technical Specification Group Core Network and Terminals; IP Multimedia (IM) sesion handling; IM call model; Stage 2 (Release 11), Mar. 2012, pp. 1-68.

Huawei, Adding MTCrx Interface to the MTC Architecture, 3GPP TSG SA WG2 Meeting #78, Feb. 22-26, 2010 San Francisco, USA, SA WG2, Temporary Document, TD S2-101084, pp. 1-6.

3GPP TR 23.888 V1.6.1, 3rd Generation Partnership Project; Technical Specification Group Services and System Aspects; System Improvements for Machine-Type Communications (Release 11), Feb. 2012, pp. 1-165.

\* cited by examiner

QUALITY OF SERVICE SUPPORT FOR MACHINE-TO-MACHINE APPLICATIONS INCLUDING E-HEALTH

CROSS REFERENCE TO RELATED APPLICATIONS

This application claims the benefit of priority to U.S. Provisional Patent Application No. 61/621,645 filed Apr. 9, 2012 and U.S. Provisional Patent Application No. 61/698,929 filed Sep. 10, 2012, the contents of which are expressly incorporated herein by reference.

TECHNICAL FIELD

This disclosure generally relates to the support for Quality of Service (QoS). More particularly, this disclosure relates to support for QoS in communications related to establishing Machine-to-Machine (M2M) communications between nodes in a manner that provides an efficient setup and the necessary quality of connection.

BACKGROUND

Machine to machine (M2M) devices (also referred to a machine-type communications (MTC) devices) are growing in importance and distribution as they provide for an improved monitoring and control infrastructure. The M2M devices serve as platforms for applications that make use of the sensors and communications equipment provided by the M2M devices. In an IMS environment, it is the application-device pairing that is considered as a unique entity, not the device itself. This allows for the traffic of each application to be treated differently, and to be routed differently.

Many M2M devices rely on a mobile network for data connectivity. If each of these devices maintains a unique identity and freely communicates with which ever nodes it wants to, the network resources consumed by a large number of these devices quickly becomes unmanageable. To address this, there is interest in making use of already existing IP Multimedia Subsystem (IMS) network infrastructure to manage these devices. The use of the existing telecommunications infrastructure to provide services to the M2M devices allows for simplified deployment of these devices in a managed manner.

As these deployments have increased there has been increased interest in additional features for M2M services, including the ability of M2M communications to be sent with a Quality of Service. Many problems arise as a result of attempting to provide a Quality of Service guarantee between applications when the communication crosses different service capability layers (SCL) in an IMS network.

Therefore, it would be desirable to provide a system and method that obviate or mitigate the above described problems

SUMMARY

It is an object of the present invention to obviate or mitigate at least one disadvantage of the prior art.

In a first aspect of the present invention, there is provided a method of establishing a session with a machine-to-machine device to provide access to a service. The method comprises the steps of receiving, at a network application, from a machine-to-machine device, a request to establish a session having an established quality of service; determining, at the network application, that a service associated with the request is provided by an application server; forwarding a request, determined in accordance with the received request, to the application server; and responsive to a reply to the forwarded request indicative that the application server will provide the associated service to the machine-to-machine device, establishing a session with the machine-to-machine device in which the machine-to-machine device is provided with proxied access to the service provided by the application server so as to hide the application server from the machine-to-machine device.

In an embodiment of the first aspect of the present invention, the request from the machine-to-machine device is received from a network service control layer entity associated with the network application. In a further embodiment, the network service control layer entity is also associated with the machine-to-machine device. Optionally, the machine-to-machine device is associated with a network service control layer entity distinct from the network service control layer entity associated with the network application. In further embodiments, the network service control layer entity associated with the machine-to-machine device and the network service control layer entity associated with the network application communicate with each other through an Internet Protocol Multimedia Service core network. In another embodiment, received request is received from a network service control layer entity in response to a subscription request and optionally, received request is retrieved from the network service control layer in response to a notification issued in response to the subscription request.

In a second aspect of the present invention, there is provided a network application server for providing an application to machine to machine devices. The network application server comprises a network interface, a processor and a memory. The network interface allow for communication over a network with machine to machine devices. The memory stores program executable instructions. The processor upon executing the stored instructions can determine that a request received over the network interface from a machine to machine device is associated with a service provided by an application server reachable through the network interface; forward a request determined in accordance with the received request to the application server; and responsive to a reply to the forwarded request indicative that the application server will provide the associated service to the machine to machine device, establishing a session with machine-to-machine device in which the machine-to-machine device is provided with proxied access to the service provided by the application server so as to hide the application server from the machine-to-machine device.

In a third aspect of the present invention, there is provided a method of ensuring quality of service between a machine-to-machine device and a network application for execution by a network service control layer entity. The method comprises the steps of receiving, over a network interface, a request from one of the machine to machine device and the network application to establish a session having a quality of service; creating a quality of service reservation associated with the received request; forwarding, over a network interface and towards the other of the machine to machine device and the network application, a request to establish a session including a reference to the created quality of service reservation; receiving, over a network interface and in response to the forwarded request, confirmation of the session creation accompanied by a second quality of service reservation; and creating a binding between the created and received quality of service reservations.

In an embodiment of the third aspect of the present invention, the step of creating a quality of service reservation includes creating a document having an associated universal resource indicator (URI). In another embodiment, the step of forwarding includes forwarding the associated URI. In a further embodiment, the step of receiving includes receiving a URI associated with the second quality of service reservation. In another embodiment, each of the first and second quality of service reservations reserve resources between one of the machine to machine device and the network application and a node in an Internet Protocol Multimedia Subsystem, IMS, network.

In a fourth aspect of the present invention, there is provided a network service control layer entity for managing pairing of quality of service reservations. The entity comprises a network interface a processor and a memory. The network interface allows for communication over a network with a machine to machine device and a network application. The memory stores instructions. The processor, upon execution of the instructions stored by the memory can create a first quality of service reservation in response to receiving a request from one of the machine to machine device and the network application to create a session with the other of the machine to machine device and the network application, forward a request determined in accordance with the received request, to the other of the machine to machine device and the network application, the forwarded request containing a reference to the created reservation, receiving in response to the forwarded request a reference to a second quality of service reservation associated with the other of the machine to machine device and the network application, and bind the first and second quality of service reservations together.

In an embodiment of the fourth aspect, the first quality of service reservation is associated with the one of the machine to machine device and the network application from which the received request is received. In a further embodiment, the binding ensures that modifications to one of the first and second quality of service reservations is reflected in the other of the first and second quality of service reservations.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
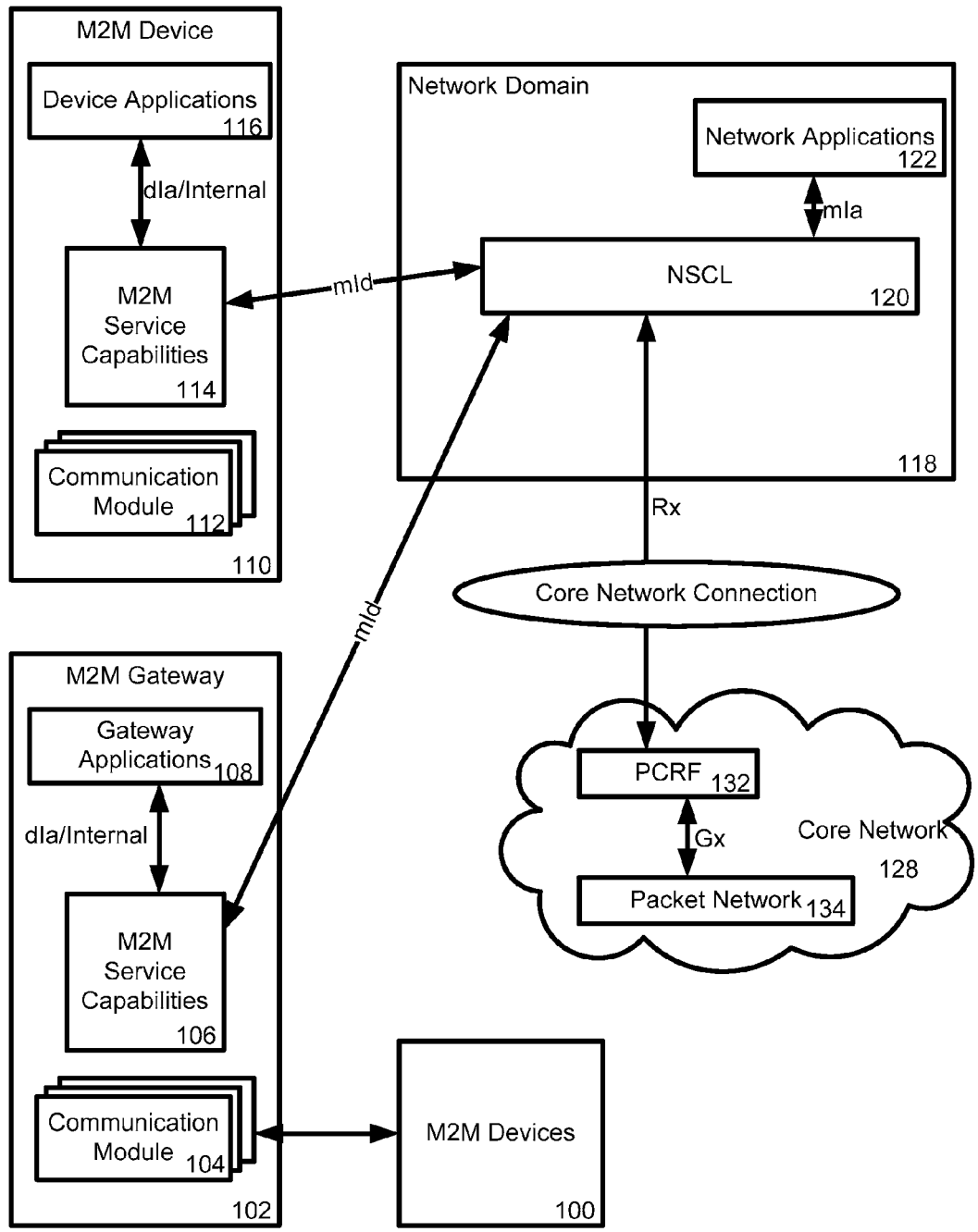
FIG. 1 illustrates an architecture according to an embodiment of the present invention.

The present invention is directed to a system and method for supporting the provision of Quality of Service for Machine-to-Machine type communications.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

In M2M, management of electronic health devices and the data that they generate is an important domain that requires network level QoS to support the devices and applications that provide services such as remote monitoring of patient health. Remote monitoring in general refers to anything that can be monitored for a patient that is connected to a device. With sufficiently portable and connected devices the patient can be monitored in his home freeing up hospital resources. The monitored parameters could be pulse, blood pressure, sugar levels, etc. Remote monitoring is an area that is gaining popularity since it can contribute to reduction of health costs by preventing visits to doctors in their offices, clinics and hospitals for the simple purpose of checking values to ensure that they are within acceptable ranges.

There are 2 embodiments that will be presented below. The first embodiment can be used when a static QoS profile is required for remote monitoring. A static QoS implies no negotiation is required for the request, and the request is either accepted or rejected by the destination. The second embodiment can be used when the dynamic QoS negotiation is required to locate an appropriate target destination for remote monitoring.

One skilled in the art will appreciate that a number of principles can be established as a guideline for implementing different embodiments of the present invention. A number of these guidelines will now be presented, with the understanding that not all of them need to be met in every embodiment. A first guideline is that when applications engage each other in an exchange where there is a Quality of Service in place, a QoS resource can be created for each application under the M2M resource structure. This M2M resource structure is typically stored in the M2M service provider network server capability layer (NSCL) for the purpose of managing its M2M subscribers. A further guideline is that for a network application (NA), a resource will be located under registered NA branch of the resource structure for the application. One skilled in the art will appreciate that each NA application registered with the M2M NSCL is typically allocated a branch for the management of all resources related to that application. For a device application/Gateway Application, a resource can be created under the SCL branch of the resource structure. As a result, each registered device or gateway with the M2M NSCL may be allocated a separate branch for the management of all resources related to the gateway and/or device, including applications resident on them. A further guideline is that every QoS resource can be established so that it stores a reference to other resources (such as the QoS resource of the other party in a transaction) as a URI or URL (or in another format if so defined). In a further embodiment, 2 QoS resources may be required to support distributed NSCLs (a Network application registered in one NSCL communicating with an SCL registered in another NSCL is typically a distributed environment as opposed to a central environment) and can be created even if the same NSCL is involved (both device/gateway and NA can be registered in the same NSCL). In a further guideline, QoS resource may not be modifiable by an entity other than the NSCL with which it is registered.

Non-Negotiated QoS sub-case: The typical HTTP procedure associated with setting a static QoS would involve a write procedure, and the requested resource would be associated with a network application that will be performing the remote monitoring. Support for QoS for a specific M2M procedure implies that the issuer requires explicit transport related characteristics, commonly known as QoS, to be applied to the media during data transfer associated with the procedure.

Requested QoS characteristics within a procedure can include any or all of a number of QoS related options (parameters) identified by the issuer. These parameters can include guaranteed bandwidth, maximum bit rate, priority assigned to the procedure, latency, and other factors that will be understood and appreciated by those skilled in the art. It is typically, the responsibility of the issuer to identify the parameters of interest to be applied to the procedure of interest. One skilled in the art will appreciate that the definition of QoS parameters to be applied can be achieved through the use of the Session Description Protocol as defined in RFC 4566. The non-negotiated embodiment may also be differentiated from the negotiated embodiment discussed below as will be understood by those skilled in the art.

FIG. 1 shows the architectural impacts to support static QoS. As illustrated in FIG. 1, an M2M device 100 connects through an M2M Gateway 102 having at least one communication module 104. A plurality of modules 104 can be implemented to allow a gateway to connect to different M2M devices on different access networks including devices using different access network technologies. M2M Gateway 102 includes gateway applications 108 and M2M service capabilities 106. The M2M Service Capabilities 106 provides access to the Network domain 118 as will be discussed below. The M2M service capabilities 106 can communicate with nodes in the network domain 118 typically using a mId interface such as that defined in ETSI TS 102 690, the relevant portions of which are incorporated herein by reference. The exemplary M2M devices 100 that are connected through an M2M gateway 102 are typically hidden from the M2M service provider. In another option, an M2M device 110 can be visible to the M2M service provider, and can connect directly to the M2M service provider. Similar to the M2M device gateway 108, these M2M devices 110 have, in the currently illustrated embodiment, communication modules 112, service capabilities 114 and device applications 116. The M2M service capabilities 114 can communicate with nodes in the network domain 118 using a mId interface. In particular, for both of the above described exemplary options, the mId interface can provide access to the NSCL 120 through which an mIa interface, such as that defined in ETSI TS 102 690, can provide access to network applications 122. An Rx interface can provide access from the NSCL 120 to a Policy and Charging Rule Functions (PCRF) 132 in the core network 128. PCRF 132 can make use of a Gx interface to connect to a packet network 134.

One skilled in the art will appreciate that the NSCL 120 will preferably support an Rx interface such as that defined by 3GPP TS 29.214. The mIa and dIa interface preferably support media description attribute parameters based on the Session Description Protocol as defined in RFC 4566. The NSCL 120 will preferably map media description to the Rx interface using standard 3GPP rules, and QoS resources are preferably only modifiable by the NSCL 120. Modification of any request is typically possible through the issuance of a new request.

Figure 2:
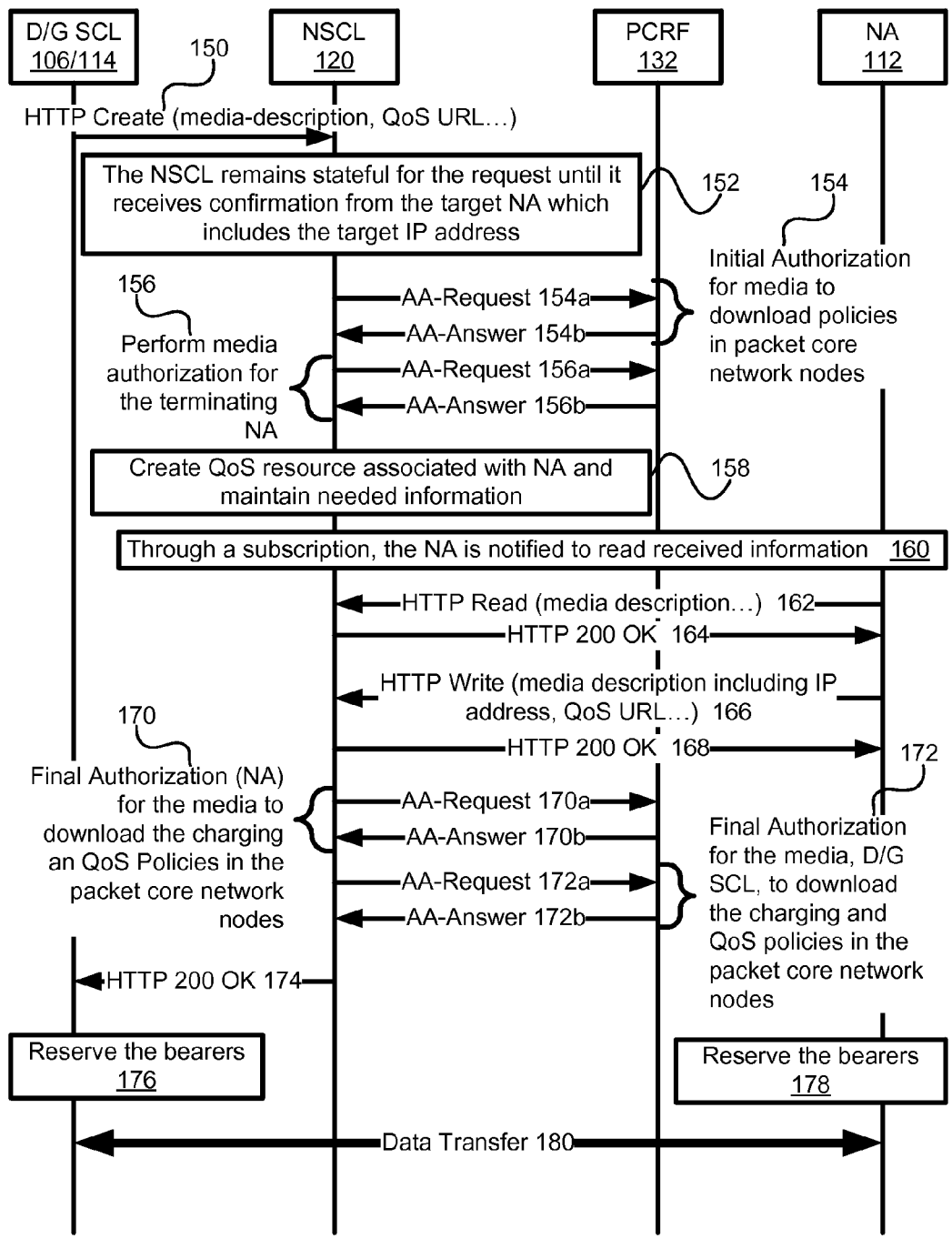
FIG. 2 illustrates a call flow of a method according to an embodiment of the present invention.

The following is a brief description of the exemplary call flow of FIGS. 2a and 2b which together are referred to as FIG. 2 and relate to a non-negotiated QoS initiation where the originating NSCL is the same as the terminating NSCL. One skilled in the art will appreciate that the illustrated case describes a scenario in which the gateway or device M2M Service Capabilities (referred to as G/D SCL) 106/114 and the NA 122 are registered in the same NSCL 120. To begin the process, the G/D SCL 106/114 triggers a QoS request through an HTTP CREATE/WRITE request 150 that preferably includes the requested media description. From the media description, the NSCL 120 can conclude that this request is a non-negotiated QoS request (only a single offer is included). The request may also include the QoS URL associated with the target NA 122 for the request. The NSCL 120 will preferably behave in a stateful manner for the QoS request until such time as it receives a confirmation from the target NA 122 so it obtain final authorization from the PCRF node as indicated in 152. In step 154, the NSCL can obtain initial media authorization from the PCRF 132 for the G/D SCL 106/114. This can be done through a combination of an AA Request (AAR) 154a sent from the NSCL 120 to the PCRF 132, and the corresponding AA Answer (AAA) 154b sent from the PCRF 132 to the NSCL 120 in response. In step 156, the NSCL 120 obtains media authorization from the PCRF 132 for the NA 122, as illustrated by AAR 156a from NSCL 120 to PCRF 132 and AAA 156b from PCRF 132 to NSCL 120. As a result, in the combination of steps 154 and 156, the NSCL 120 obtains media authorization for both ends of the request. In step 158, the NSCL 120 updates the QoS resource associated with the NA 122, and the G/D SCL 106/114 and maintains the necessary information, including a reference to the QoS resource URL associated with the originating G/D SCL 106/114. In step 160, the NA 122 associated with the remote monitoring, or other NA applications that support QoS, will typically use a subscription feature to be notified of any requests from applications on G/D SCL 106/114. At this point the NA 122 needs to obtain information about the reserves resources, as illustrated by HTTP READ 162 and HTTP 200 OK 164, the NA 122 can request from NSCL 120 the QoS resource URL specified in the originating request as well as the QoS resource URL created for the G/D SCL 106/114. This makes the NA 122 aware of a request for a non-negotiated QoS enabled data transfer from a G/D SCL 106/114. The NSCL 120 can then update the QoS resource associated with the NA 122 and maintain the necessary information in the resource. The NA can both confirm the offer and update a target IP address associated with the offer. This can be done through the use of HTTP WRITE 166. The HTTP request 166 can include the media description and the NA QoS resource URL. The NSCL can update its internal state for the QoS resource associated with the NA 122 and respond with HTTP 200 OK 168. The NSCL 120 now has the information needed to update the PCRF 132 (as illustrated in FIG. 1, this can be done through the Rx interface) and obtain the proper final authorization for the NA 122, as shown in step 170. In the illustrated exemplary embodiment, this is done through the exchange of AAR 170*a* and AAA 170*b*. In Step 172, the NSCL 120 has the information needed to update the PCRF 132 through the Rx interface and obtain proper final media authorization for the G/D SCL 106/114. This can be done through the exchange of AAR 172*a* and AAA 172*b*. At this stage, the QoS resource for the originating G/D SCL 106/114 can be updated as well. Once this is successfully done, the NSCL 120 can return an HTTP 200 OK message 174 to the G/D SCL 106/114. Following this, the proper bearers 176 and 178 can be established by both peers and upon successful completion, data transfer 180 can commence. One skilled in the art will appreciate that there may be different PCRFs associated with the G/D SCL 106/114 and the NA 122, in which case the NSCL 120 can perform steps 154 and 172 with one PCRF and steps 156 and 170 with a different PCRF. Additionally, if the originating NSCL and destination NSCL are distinct nodes then there will be different QoS resources used in each NSCL. The original NSCL will also have to transfer to the terminating NSCL the QoS Resource URL associated with the G/D SCL 106/114.

Figure 3:
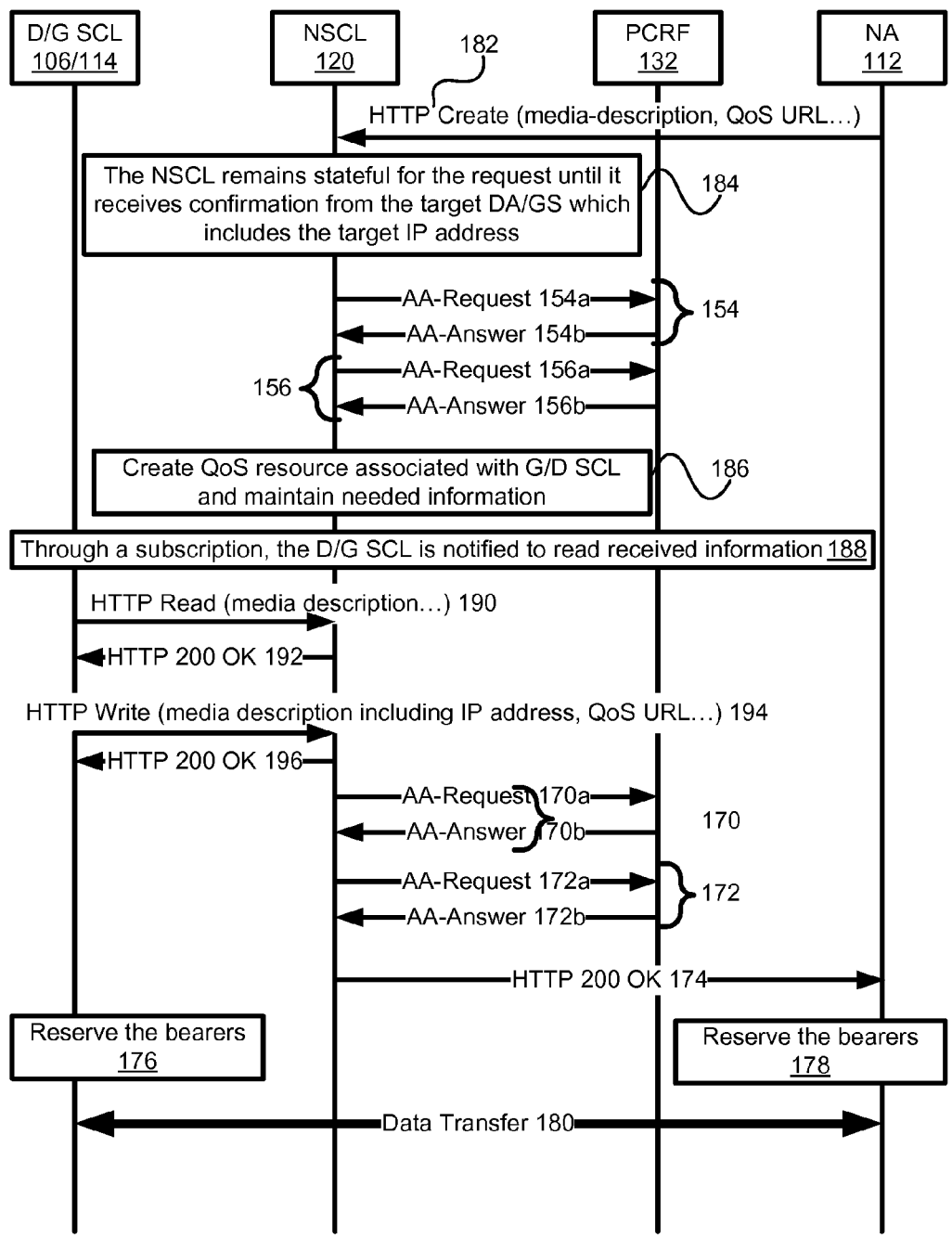
FIG. 3 illustrates a call flow of a method according to an embodiment of the present invention.

The call flow of FIG. 3*a* and FIG. 3*b*, which when taken together may be referred to as FIG. 3, illustrates an exemplary case when the NA initiates the session. In this scenario, NA 122 transmits an HTTP CREATE request 182 to the NSCL 120. The NSCL is stateful of requests until it receives confirmation from the target G/D SCL 106/114 that includes the target address as indicated in step 184. Steps 154 and 156 are carried out as described in FIG. 2. QoS resources are created and maintained as illustrated in step 184. In step 188, the G/D SCL 106/114 is notified so that it is ready to receive information. HTTP READ request 190 (along with a corresponding HTTP 200 OK 192) and HTTP WRITE message 194 (along with corresponding HTTP 200 OK 196) are exchanged between the G/D SCL 106/114 and the NSCL 120 to transfer media description information. Final Authorization for the media to download the charging and QoS policies is obtained in exchanges between the NSCL 120 and the PCRF 132 in steps 170 and 172 as described in FIG. 2. Notification of the completion of the setup is provided by NSCL 120 to NA 122 with HTTP 200 OK message 198. In 176 and 178, the required bearers are reserved data transfer 180 can be commenced.

The negotiated QoS embodiment refers to the situation when dynamic negotiation is required between the 2 entities that will exchange data. This is typically the case in remote monitoring situations in e-health where some negotiation is required so that the connection endpoints can agree on a QoS before the data transfer can start.

Figure 4:
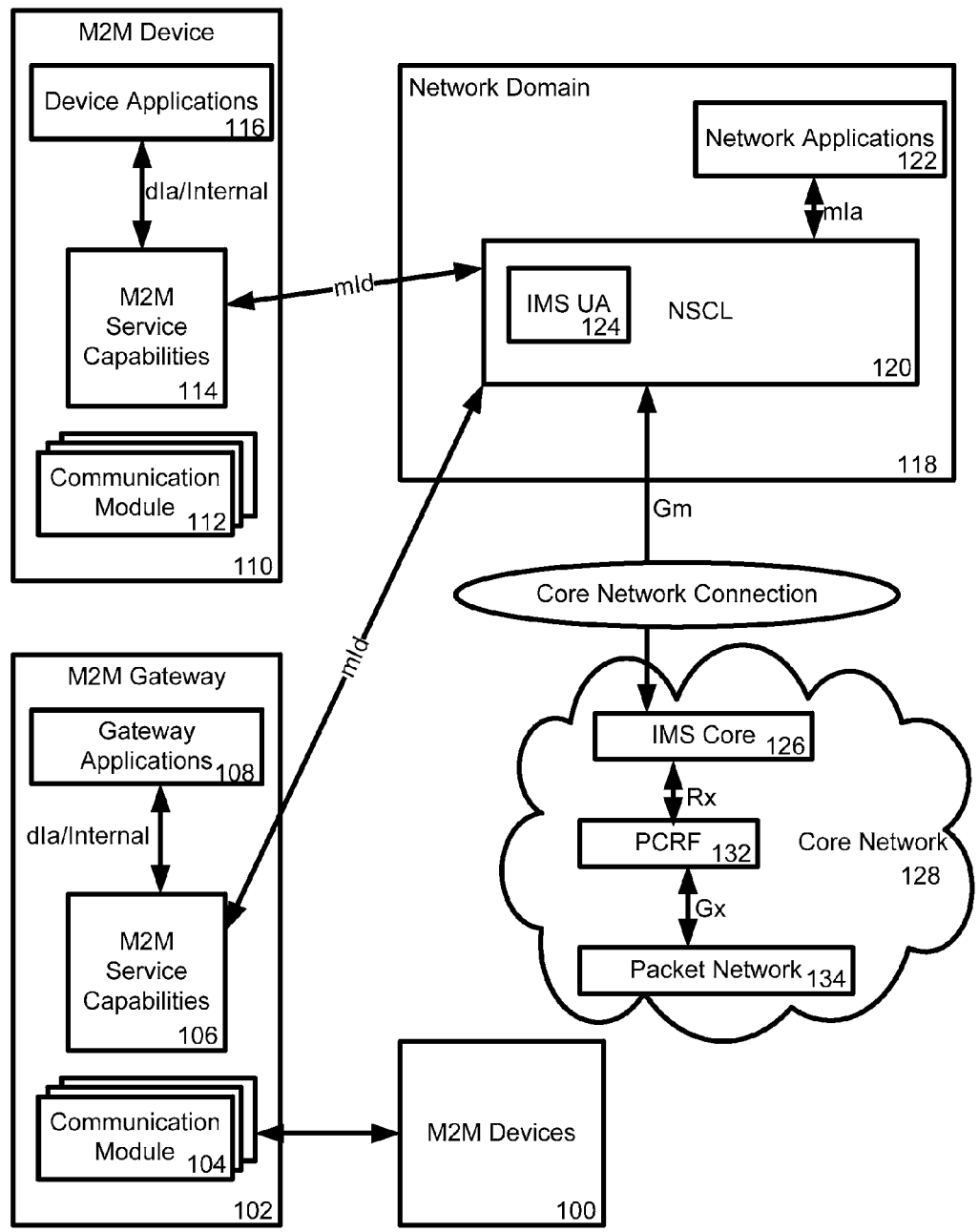
FIG. 4 illustrates an architecture according to an embodiment of the present invention.

As can be seen in FIG. 4, the IMS core network provides functionality that can be relied upon to provide QoS support. The IMS network in conjunction with the Policy and Charging Rule Functions (PCRF) 132 may include all the required functionality for QoS support for a negotiated QoS.

As illustrated in FIG. 4, an M2M device 100 connects through an M2M Gateway 102 having at least one communication module 104. A plurality of modules 104 can be implemented to allow a gateway to connect to different M2M devices on different access networks including devices using different access network technologies. M2M Gateway 102 includes gateway applications 108 and M2M service capabilities 106. The M2M Service Capabilities 106 provides access to the Network domain 118 as will be discussed below. The M2M service capabilities 106 can communicate with nodes in the network domain 118 using a mId interface. The exemplary M2M devices 100 that are connected through an M2M gateway 102 are typically hidden from the M2M service provider. In another option, an M2M device 110 can be visible to the M2M service provider, and can connect directly to the M2M service provider. Similar to the M2M device gateway 108, these M2M devices 110 have, in the currently illustrated embodiment, communication modules 112, service capabilities 114 and device applications 116. The M2M service capabilities 114 can communicate with nodes in the network domain 118 using a mId interface. In particular, for both of the above described exemplary options, the mId interface can provide access to the NSCL 120 through which an mIa interface can provide access to network applications 122. NSCL 120 can also host an IMS US 124. A Gm interface, such as that defined in 3GPP TS 23.228, and TS 24.229, can provide connectivity to an IMS core 126. An Rx interface can provide access from the IMS Core 126 to a Policy and Charging Rule Functions (PCRF) 132 in the core network 128. PCRF 132 can make use of a Gx interface to connect to a packet network 134.

To enable the NSCL 120 to trigger this functionality, it will preferably support the Gm interface. This architecture does not require changes to existing M2M interfaces other than the additional support for the requested QoS parameters for the various procedures, which may be optional. This applies to all interfaces mIa, dIa, and mId.

Prior to initiating interactions with the IMS core network 126, the NSCL 120 will preferably register with the IMS core network 126. To that effect, the NSCL 120 can have a public identity allocated to it by the access network provider as well as credentials that can be used during IMS registration for authentication purposes. This allows the NSCL 120 not to be owned by the access network provider. IMS registration can occur at any time before any interaction with the IMS network.

M2M applications may not require an IMS subscription. In such a case, the NSCL 120 can have a single IMS subscription covering a plurality of the M2M applications. This NSCL IMS subscription will preferably have a wild carded public identity allocated to it. Two different sets of wild carded public identities can be allocated for the NSCL 120, one for registered SCLs, the other for registered NA applications. Upon successful IMS registration of the M2M NSCL 120, and for each successfully registered SCL with the M2M NSCL 120, the NSCL 120 can allocate a specific IMS public identity to the SCL from the proper set. Similarly, for every successfully registered NA 122, the NSCL 120 can allocate a specific IMS public identity to the NA 122 from the proper set. The wild carded IMPU corresponding to the SCL can have the SCL-ID and the M2M Subscription ID as the dynamic part. The wild carded IMPU corresponding to the NA 122 shall have the Network application ID and the M2M Subscription ID as the dynamic part. The NSCL 120 can maintain these bindings, as attributes in the tree information model, as long as the SCL or NA 122 is registered and will only be removed upon deregistration from the NSCL 120.

Figure 5:
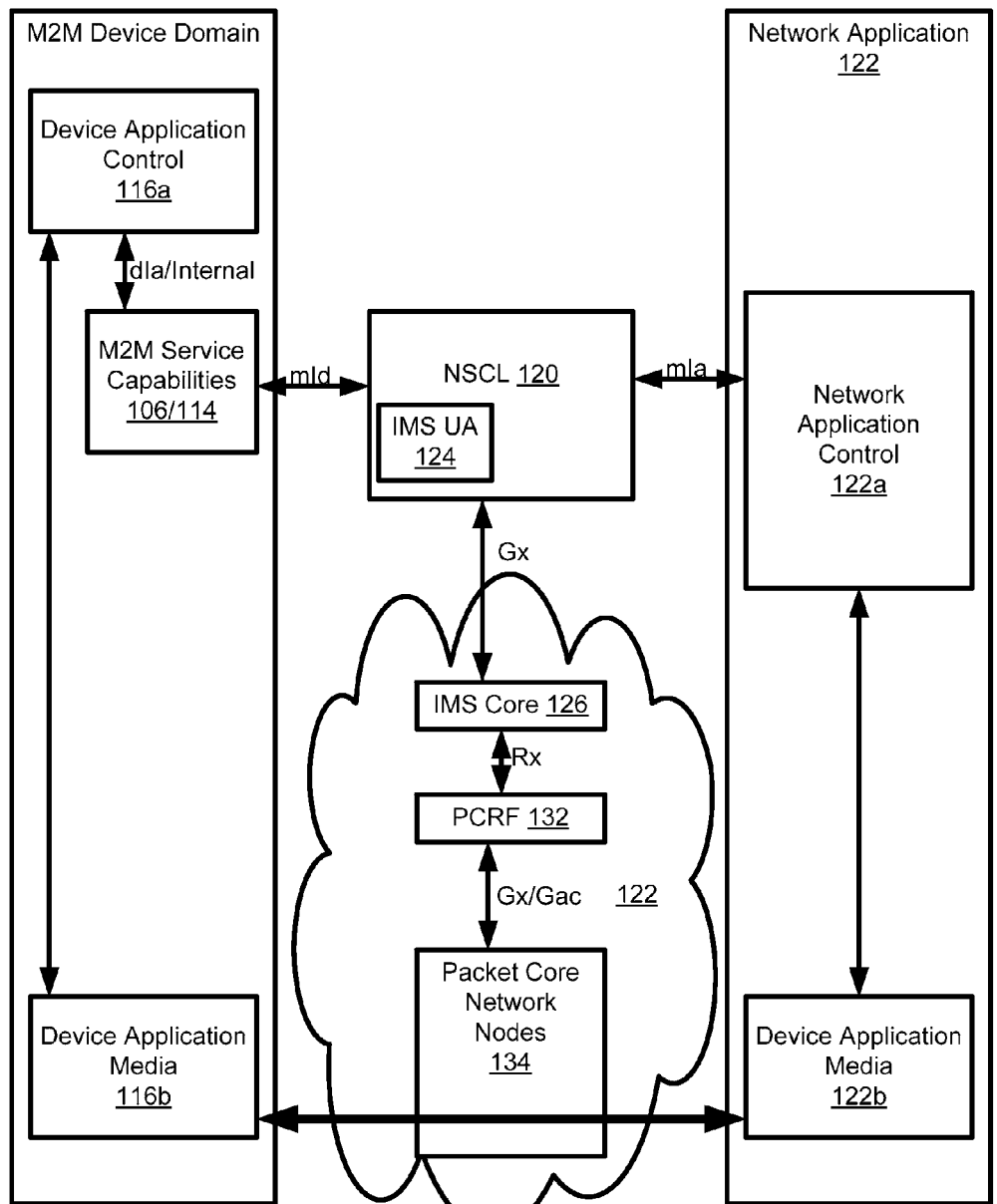
FIG. 5 illustrates a call flow of a method according to an embodiment of the present invention.

With respect to the NSCL Initiated Procedure High Level Call Flow, there are two options for the IMS UA 124 to support in its interaction with the IMS core network. The two options are discussed below. FIG. 5 illustrates a high level architecture that is applicable to both options. As shown in FIG. 5, in the M2M Device Domain, Device Application Control 116a and Device Application Media 116b communicate with each other. The Device Application Control 116a also makes use of a dIa/Internal interface to communicate with the M2M Service Capabilities 106/114. In the Network Domain, the NSCL 120 hosts the IMS UA 124, and communicates with the G/D SCL 106/114 over the mId interface. NSCL 120 can also make use of a Gm interface to communicate with the IMS Core 126 in core network 122. IMS Core 126 makes use of an Rx interface to communicate with the PCRF 132, which in turn makes use of a Gx/Gac interface to communicate with the Packet Core network nodes 134. In the Network Application 122, the Network application Control 122a makes use of an mIa interface to connect to the NSCL 120, and an internal interface to connect to the Network Application Media 122b. From the application layer perspective, the Device Application Media 116b and the Network Application Media 122b communicate with each other without traversing the NSCL 120. One skilled in the art will appreciate that in this exemplary embodiment, only the interaction between Device Application Control 116a and the Network Application control 122a goes through the NSCL 120.

Figure 6:
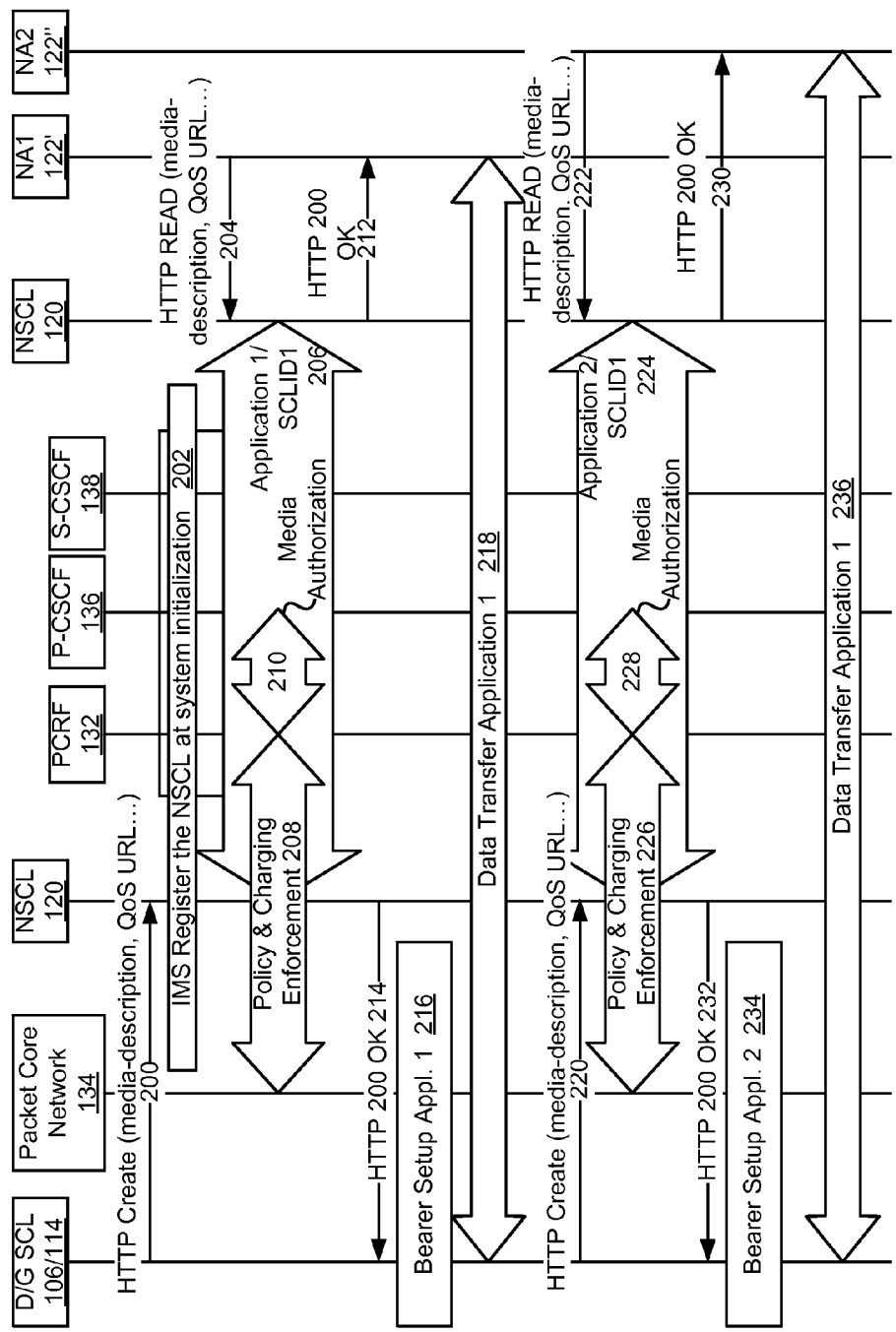
FIG. 6 illustrates a call flow of a method according to an embodiment of the present invention.

FIG. 6 illustrates an exemplary call flow in which each application make use of a unique IMS session (one IMS session per application (NA/DA/GA)). One characteristic of this exemplary option is that a single IMS session is used for each M2M application requiring QoS. In this embodiment, the application ID can be used at the IMS session level in the SDP carried within the SIP INVITE message. The call flow of FIG. 6 illustrates an example of two applications establishing two independent QoS related sessions.

In step 200, the G/D SCL 106/114 initiates an HTTP CREATE request 200 to the NSCL 120 on behalf of the application hosted on the M2M device. This request typically will include media description and the QoS URL resource for the target NA 122'. In step 202, the NSCL 120 registers with the IMS core network 126, if it is not already registered. The NSCL 120 will then establish the required IMS session 206 for the M2M application. In this exemplary embodiment, NA1 122' obtains the media description and QoS URL, along with other relevant information in step 204, which is shown as an HTTP Read request. NA1 122' can modify the requested QoS read in step 204 and issues a new update through an HTTP WRITE which is not shown in FIG. 6 for brevity but shall be explained later. The IMS session related to application 1, belonging to SCLID1 is created, with a set of Policy & Charging rules 208 agreed upon and exchanged between the Packet Core Network 134 and the PCRF 132, and with a set of Media Authorizations 210 exchanged between the PCRF 132 and the P-CSCF 136 in the IMS Core 126. The final media description and QoS information can then be provided to NA1 122' through additional READ operations from NA 122' not shown in FIG. 6 for brevity, and confirmation of the session can be provided to G/D SCL 106/114 in HTTP 200 OK 214. At this point, the bearer setup for application 1 can be carried out as shown in 216, and data transfer for the application can be carried out in 218.

A similar procedure takes place for application NA 122" in steps 220 through 232 and will not be repeated for brevity. In this case, a second IMS session, 224 is maintained by the NSCL 120 for communicating applications. After session establishment, the bearer setup for application 2 can be carried out as shown in 234, and data transfer for the application can be carried out in 236.

One skilled in the art will appreciate that when the NSCL 120 establishes the IMS sessions 206 and 224, one for each M2M application. The application ID can be included at the session level to allow for proper charging. In both cases the interaction between the IMS core 126 and the PCRF 132 can be carried out over an Rx interface, while the interaction between PCRF 132 and the packet core network 134 for QoS enforcement can be based on Gx. The NSCL 120 can maintain a separate QoS resource for every communicating application. The QoS resource can include mapping between the IMS session, the application ID, the QoS tuples, the IP flows and pertinent information that should be maintained for the duration of the session. One skilled in the art will appreciate that the illustrated method may further include the NA 122 reading the incoming requests through the normal subscription procedures similar to the non-negotiated case, and which are not shown in FIG. 6 for brevity.

One skilled in the art will appreciate that if the originating NSCL and destination NSCL are distinct nodes then there could be different QoS resources used in each NSCL. This does not change any of the above basic principles with the only exception that the terminating NSCL will be responsible for creating the QoS resource to be used by the NA, while the originating NSCL is responsible for allocating the QoS resource to be used by the G/D SCL 106/114. A further issue that may be of note is that the originating NSCL may have to locate the terminating NSCL based on the QoS NA URL in the incoming request from the originating application. In the exemplary embodiment, it is the responsibility of the originating application to locate the proper QoS NA URL associated with the target application.

Figure 7A:
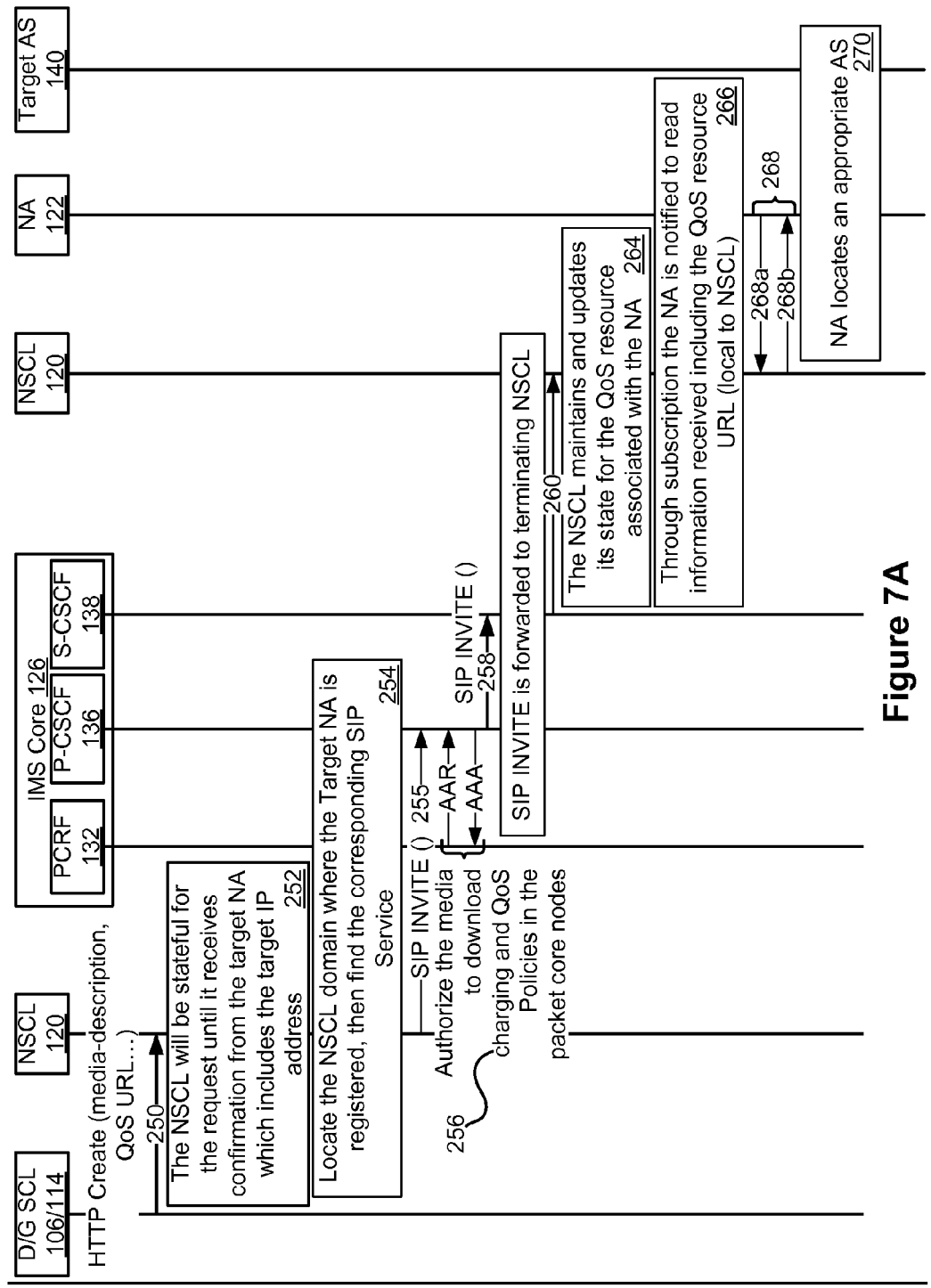
FIG. 7A illustrates a call flow of a method according to an embodiment of the present invention.
Figure 7B:
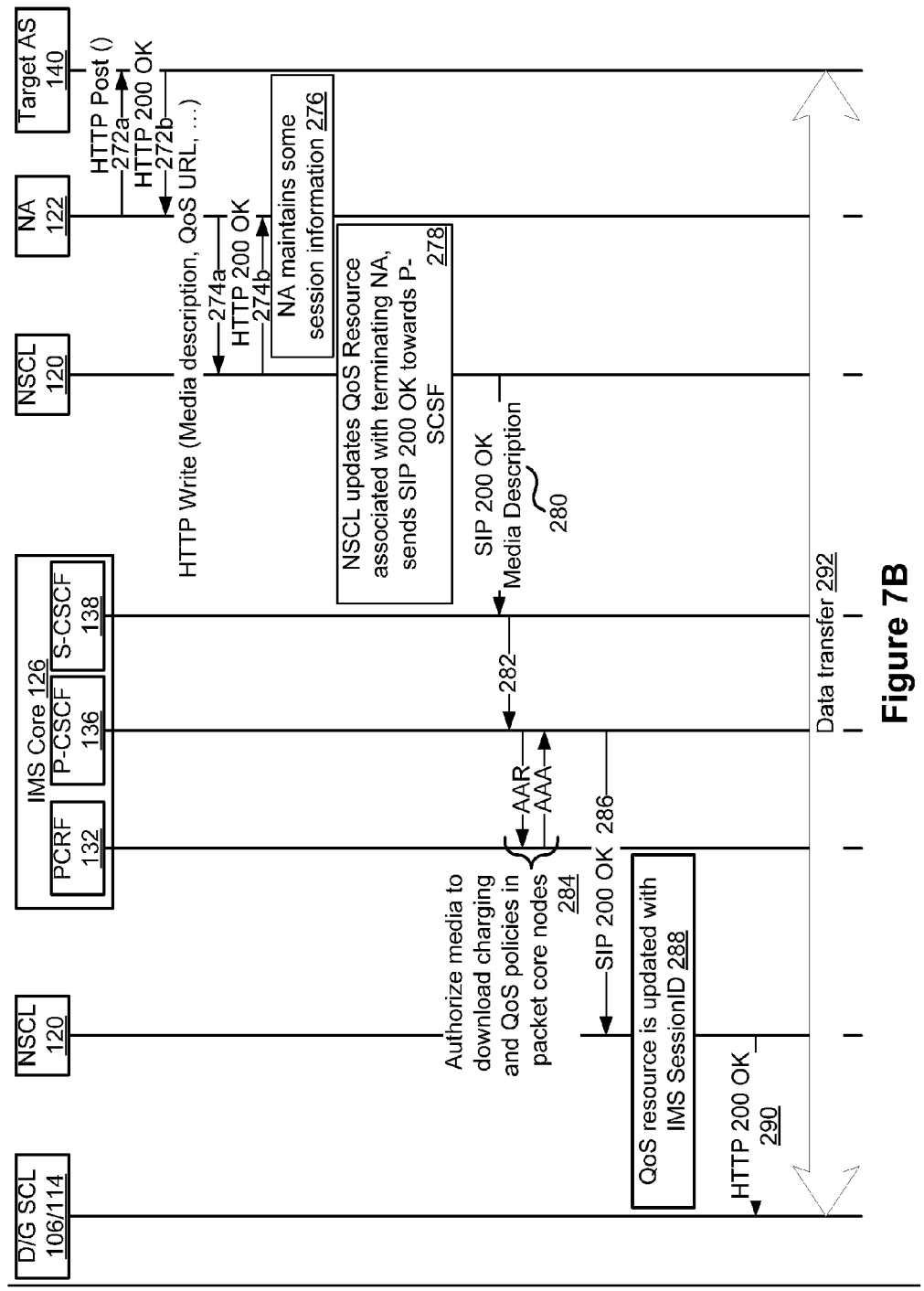
FIG. 7B illustrates the conclusion of the call flow of the method shown in FIG. 7A.

FIGS. 7a and 7b, which when taken together are referred to as FIG. 7, show a detailed call flow for the D/G SCL session initiation (where the originating NSCL is the same as the terminating NSCL). Note that in these figures we only show the IMS nodes involved with the originating NSCL. IMS nodes are also involved with the terminating NSCL but for brevity we don't show these nodes in the Figure. One skilled in the art will appreciate that similar exchanges happen within the IMS nodes and with the NSCL as well as between the PCRF and the IMS nodes at each end. Not all the exchanges are shown in the call flow for brevity. The following is a brief description of the call flow. In step 250, the G/D SCL 106/114 triggers the QoS request through an HTTP CREATE request that preferably includes the media description, the QoS URL resource associated with the target NA. From the media description, the NSCL 120 can conclude that this is a negotiated QoS request. The originating NSCL 120 is preferably stateful for the QoS request until such time as it receives a confirmation from the target NA 122 as indicated in 252. To that effect, a QoS resource can be allocated for the G/D SCL 106/114 and it preferably references the QoS resource URL associated with the target NA 122 which was included in the incoming request. The NSCL 120 can then maintain a mapping between the allocated QoS Resource URL for the G/D SCL 106/114, the IMS session, the application ID, the reference to the target QoS resource URL for the NA 122, and other pertinent information for the duration of the IMS session. In step 254, the NSCL 120 initiates an IMS session, which preferably includes the received media description, towards the NA 122. The IMS session creation request arrives at the NSCL 120 associated with the target NA 122 which, in this example is the same as the originating NSCL 120. Session setup preferably is compliant to 3GPP standards for this exemplary embodiment and as such the details of this process will be well understood by those skilled in the art and will not be discussed in detail. The IMS session will preferably include the allocated QoS resource URL for the G/D SCL 106/114 as well as the QoS resource URL for the target NA. Those skilled in the art will appreciate that there are multiple ways for including this information. In order to compose SIP INVITE message 255, which is sent by NSCL 120 to P-CSCF 136, in the originating IMS network, the NSCL 120 locates the IMS public identity allocated to the NA 122 and to the G/D SCL 106/114 by reading the proper attributes in that regard from the proper NSCL 120 (in case the NA 122 and G/D SCL 106/114 are registered in different NSCLs). In step 256, the P-CSCF 136 associated with the originating IMS domain obtains initial media authorization from the PCRF 132, as shown by AAR 256*a* and AAA 256*b*. At this point, the P-CSCF 136 forwards SIP INVITE 255 to S-CSCF 138 as SIP INVITE 258. S-CSCF 138 then forwards the invite to NSCL 120, which is the NSCL associated with NA 122, as SIP INVITE 260. The S-CSCF 138 forwards the SIP INVITE first to the terminating IMS network associated with the terminating NSCL 120 via the terminating P-CSCF, where initial media authorization is performed for the terminating application NA 122 before the SIP INVITE arrives to the terminating NSCL 120, as SIP INVITE 260, as shown in step 262. The NSCL 120 associated with the target NA 122 maintains a state for the QoS Resource associated with the target NA 122 and updates its information with the necessary association, once it receives the SIP INVITE 260, as shown in 264. In step 266, the NA 122 associated with remote monitoring or the ones that are expected to use QoS, will typically use the subscription feature to be notified of any such incoming requests.

In step 268, the NA 122 reads incoming information, as shown through HTTP READ message 268*a* and HTTP 200 OK message 268*b*, including the QoS URL associated with the originating request and at this point is aware that there is a request for a dynamic QoS enabled data transfer. In this illustrated exemplary case, NA 122 will not respond to this request (because it does not accept any of the offers in the incoming request but it is aware of another application that can handle the request) and it has to locate some other applications that can perform the remote monitoring. NA 122 identifies the target AS 140 as a possible candidate in step 270. NA 122 then sends an HTTP POST request 272*a* to the target AS 140, and receives from the target AS 140*a* media description that includes the answer to the incoming offer in an HTTP 200 OK response 272*b*. One skilled in the art will appreciate that this can be viewed the NA 122 obtaining from target AS 140 confirmation that the target AS 140 can handle the request in step 272. Implementation details of this exchange will be understood by those skilled in the art as not necessarily being germane to the remainder of the process. In step 274, NA 122 sends an HTTP WRITE request 274 back to the NSCL 120 to send the received answer from the target AS 140. The HTTP request 274 preferably includes the media description and the QoS resource URL associated with the target NA 122. One skilled in the art will appreciate that it is preferable for NA 122 has to maintain a state for this session, so that it can handle session modification and termination if need be (as illustrated in 276). All interactions between target AS 140 and the NSCL 120 are illustrated as being routed through NA 122 in this exemplary embodiment. The target AS 140 can then remain invisible as far as NSCL 120 is concerned. The terminating NSCL 120 now has all the information needed to update its internal state, as shown in step 276, and can then finalize the setup of the IMS session through the sending of the SIP 200 OK, including the media description to the originating IMS side, via the terminating P-CSCF and terminating IMS nodes, where final media authorization is performed as shown in 278. In step 280 the SIP 200 OK is received by the S-CSCF in the originating IMS domain, which can then forward it to P-CSCF 136 as SIP 200 OK message 282. In step 284, final media authorization is performed again to update the QoS policy and charging rules to be downloaded to the packet core nodes, illustrated as AAR 284*a* and AAA 284*b*. The NSCL 120 receives the SIP 200 OK response 286, and the accepted offer. NSCL 120 can then send back a SIP ACK to the P-CSCF 136 along the same path that was used for the INVITE, and update its internal state information in the QoS resource associated with the originating G/D SCL 106/114 in 288. NSCL 120 then sends back HTTP 200 OK response 290 to the originating G/D SCL 106/114. Response 290 preferably includes the accepted offer. Optionally it can include, instead of the accepted offer, the QoS resource URL that can be fetched by the G/D SCL 106/114 to read the accepted offer. Subsequently, bearer reservation can take place followed by data transfer 292. One skilled in the art will appreciate that there may be different PCRFs associated with the G/D SCL 106/114 and the NA 122, in which case the NSCL 120 will have to perform step 256, 284 with one PCRF, while steps 262 and 276 will be performed with a different PCRF.

One skilled in the art will appreciate that session modification can be implemented using a similar process to the session initiation procedure with following clarification in the previous call flow: in place of SIP INVITE ( ) 255, a SIP-re-INVITE message can be used; and in step 270, the NA 122 is already stateful to the fact that it is the target AS 140 that has been previously contacted for this session, and as such it can forward the new offer to it.

Figure 8A:
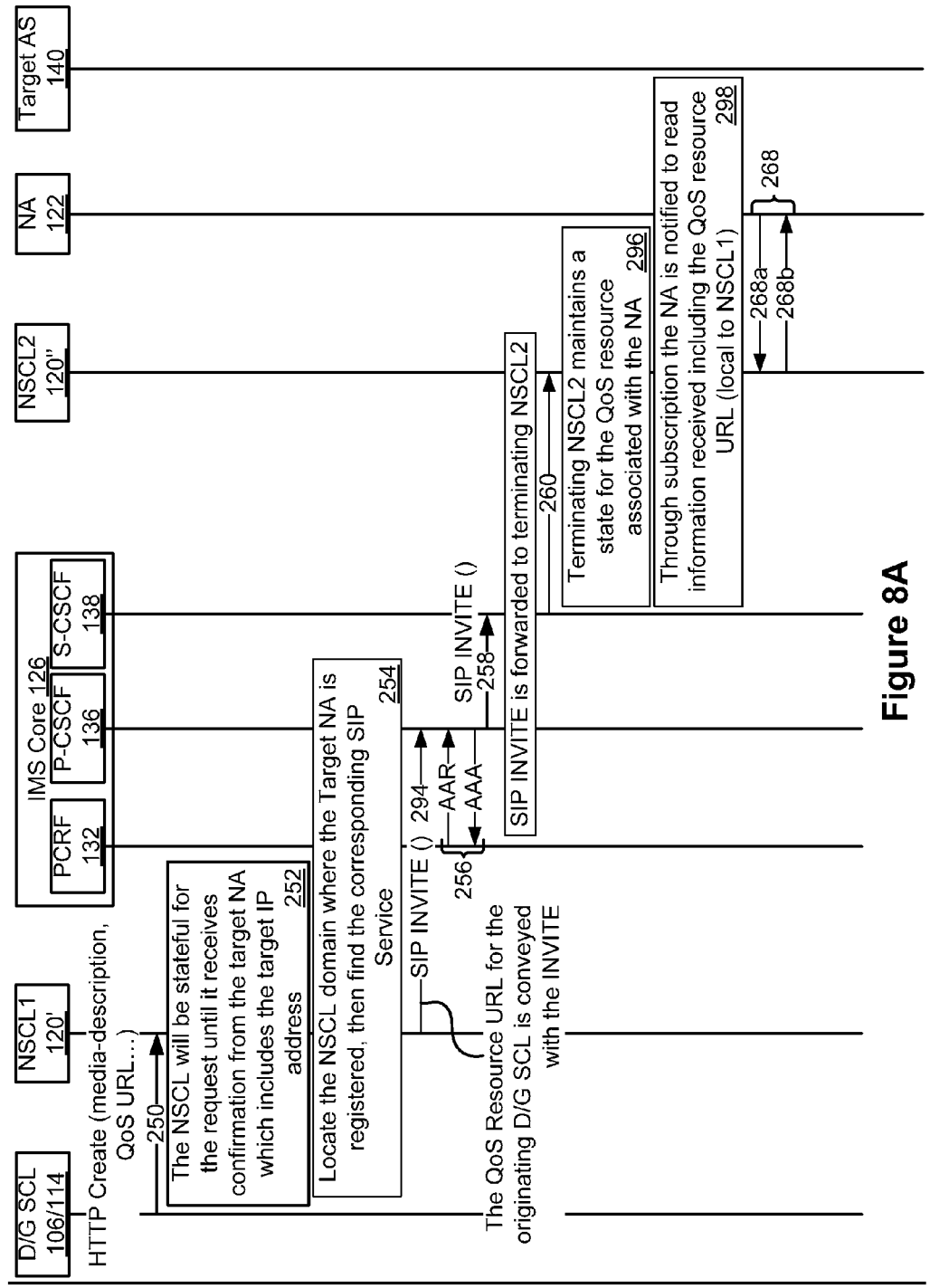
FIG. 8A illustrates a call flow of a method according to an embodiment of the present invention.
Figure 8B:
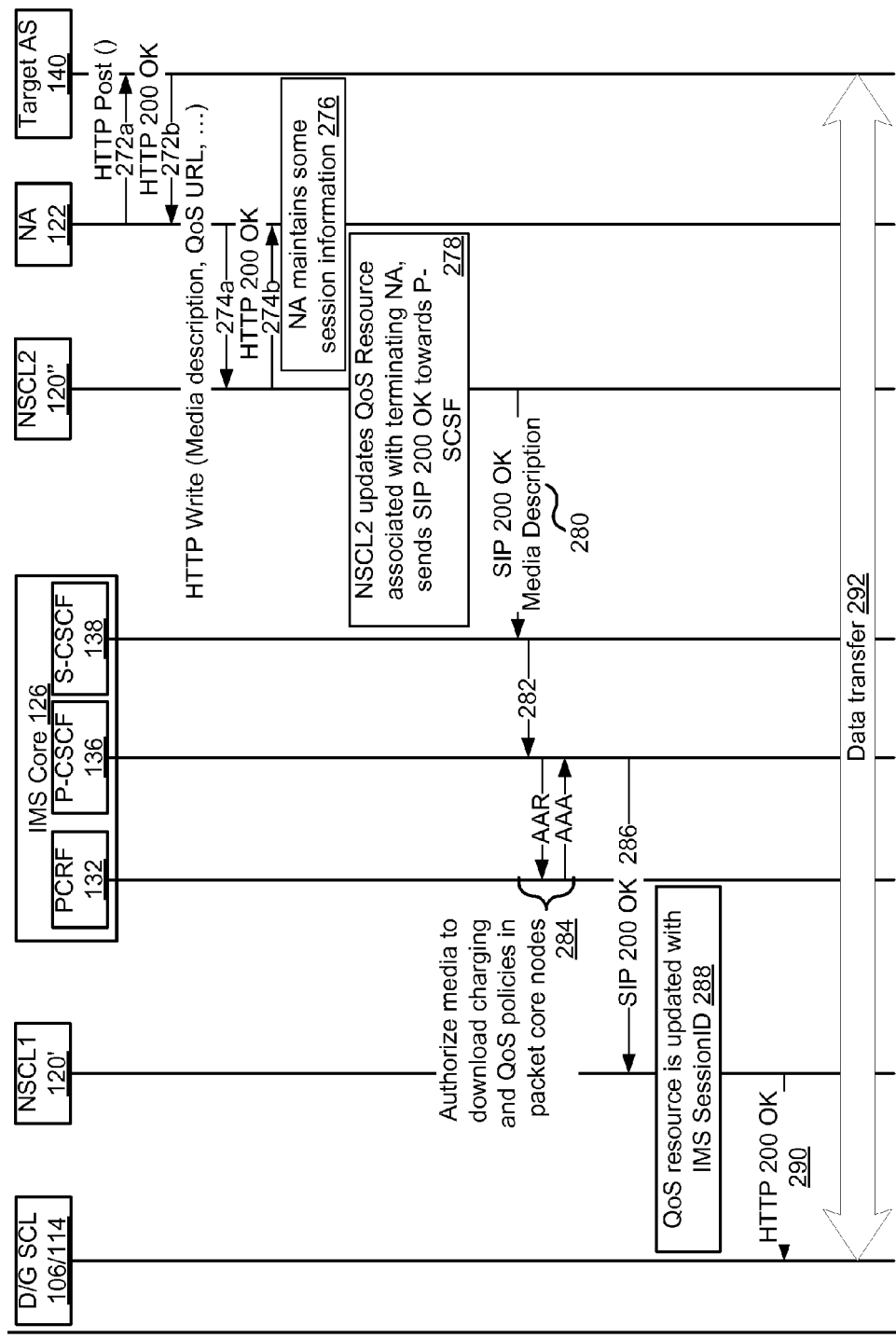
FIG. 8B illustrates the conclusion of the call flow of the method shown in FIG. 8A.

The FIGS. 8*a* and 8*b* show an exemplary call flow when different NSCLs are involved because the originating G/D SCL 106/114 and the NA 122 are registered in different NSCLs. It should be understood that there may be different PCRFs associated with the G/D SCL 106/114 and the NA 122 and this can be handled as described above. As before, steps 250, 252 and 254 are carried out, but are carried out at the first NSCL, NSCL1 120'. In step 254 it is determined that the target NA is connected to a different NSCL, NSCL2 120". In order to determine the IMS identity associated with the terminating NA 122, NSCL1 120' must read this information from NSCL2 120". To that effect, NSCL1 120' uses the incoming information in step 250 to compose the proper request to NSCL2 120" to read the IMS identity. Following that, NSCL1 120' can compose the SIP INVITE, This step is not shown in FIG. 8 for brevity. SIP INVITE 294 is sent to P-CSCF 138, and the QoS resource URL for the originating G/D SCL 106/114 is conveyed in the SIP INVITE. As before, steps 256, 258 and 260 obtain authorization, and forward the invite to NSCL2 120". In step 296, the terminating NSCL, in this case NSCL2 120", maintains a state for the QoS resource associated with the NA 122. In step 298, through a subscription the NA 122 is notified to read information received including the QoS resource URL which is local to NSCL1 120'. Steps 268 through 292 are carried out as before, as illustrated in the balance of FIGS. 8*a* and 8*b*.

Figure 9A:
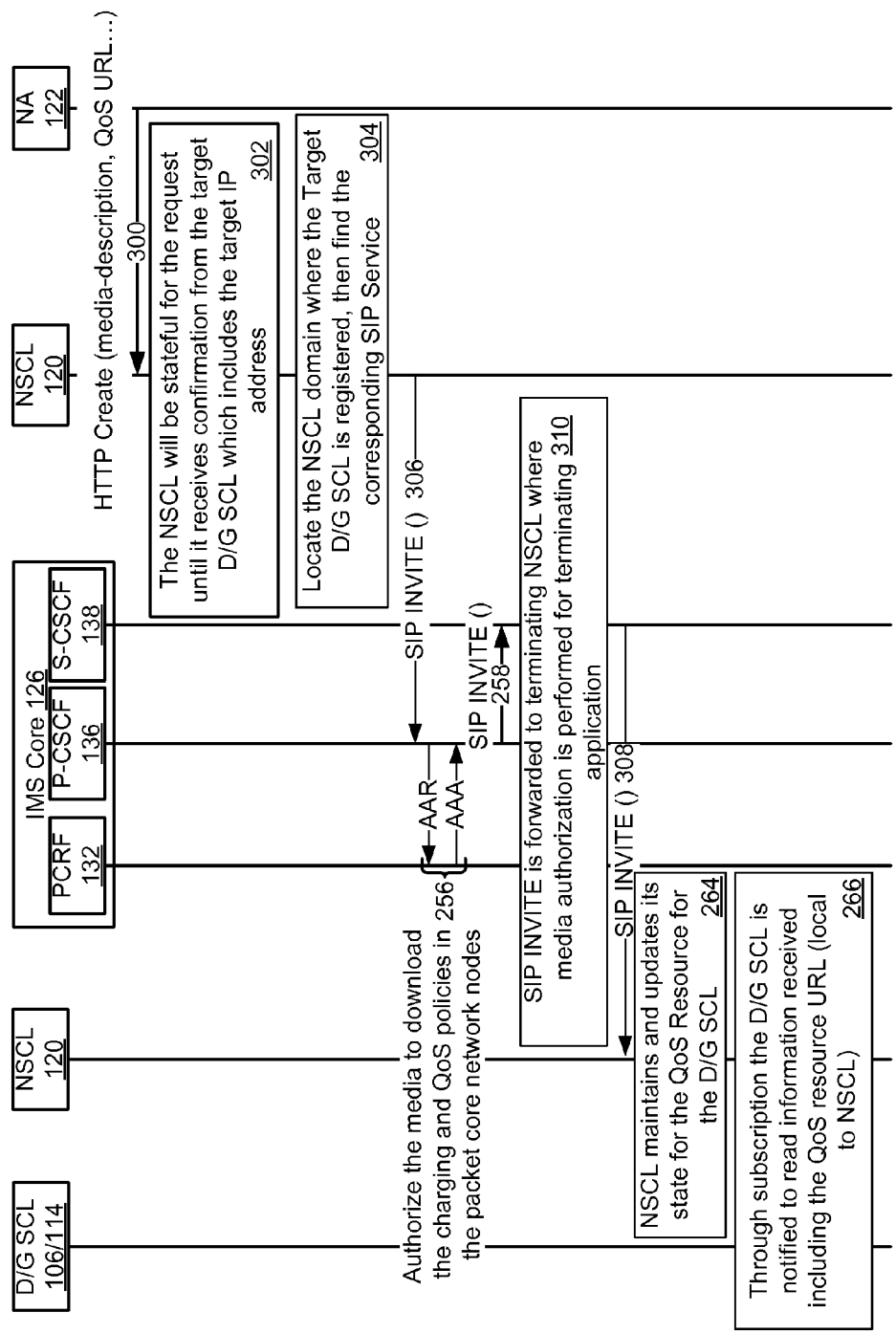
FIG. 9A illustrates a call flow of a method according to an embodiment of the present invention.
Figure 9B:
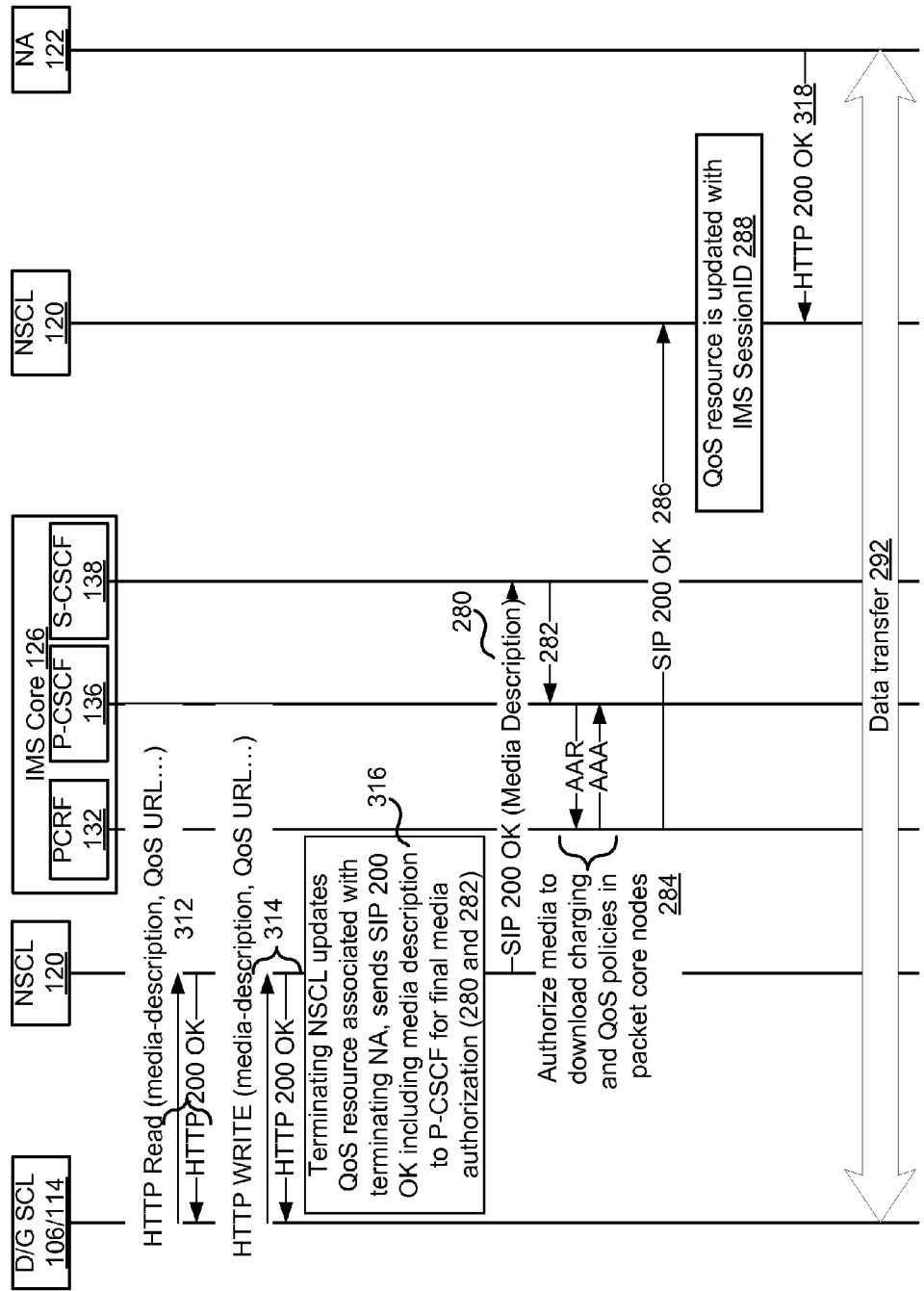
FIG. 9B illustrates the conclusion of the call flow of the method shown in FIG. 9A.

FIGS. 9*a* and 9*b* illustrate the call flows for the situation in which the NA 122 triggers session initiation. The following is a brief description of the call flow. In step 300, NA 122 triggers the QoS request through an HTTP CREATE request that preferably includes the media description, the QoS URL resource associated with the target G/D SCL 106/114. From the media description, the NSCL 120 can conclude that this is a negotiated QoS request. The originating NSCL 120 is preferably stateful for the QoS request until such time as it receives a confirmation from the target G/D SCL 106/114 as indicated in 302. To that effect, a QoS resource can be allocated for the NA 122 and it preferably references the QoS resource URL associated with the target G/D SCL 106/114 which was included in the incoming request. The NSCL 120 can then maintain a mapping between the allocated QoS Resource URL, the IMS session, the application ID, the reference to the target QoS resource URL for the G/D SCL 106/114, and other pertinent information for the duration of the IMS session. In step 306, the NSCL 120 initiates an IMS session through the use of a SIP INVITE( ), which preferably includes the received media description, towards the G/D SCL 106/114. The IMS session arrives at the NSCL 120 associated with the target G/D SCL 106/114 which, in this example is the same as the originating NSCL 120. Session setup preferably is compliant to 3GPP standards for this exemplary embodiment and as such the details of this process will be well understood by those skilled in the art and will not be discussed in detail. The IMS session request will preferably include the allocated QoS resource URL for the NA 122 as well as the QoS resource URL for the target G/D SCL 106/114. Those skilled in the art will appreciate that there are multiple ways for including this information. In order to compose SIP INVITE message 306, which is sent by NSCL 120 to P-CSCF 136, the NSCL 120 locates the IMS public identity allocated to the G/D SCL 106/114 and to the NA 122 by reading the proper attributes in that regard from the proper NSCL 120 (in case the NA 122 and G/D SCL 106/114 are registered in different NSCLs). In step 256, P-CSCF 136 obtains initial media authorization from the PCRF 132, as shown by AAR 256*a* and AAA 256*b*. At this point, the P-CSCF 136 forwards SIP INVITE to S-CSCF 138 as SIP INVITE 258. The S-CSCF 138 forwards the SIP INVITE first to the terminating IMS network associated with the terminating NSCL 120 via the terminating P-CSCF, where initial media authorization is performed for the terminating application before the SIP INVITE arrives to the terminating NSCL 120 as shown in step 310. The terminating NSCL 120 associated with terminating G/D SCL 106/114, receives the SIP INVITE 308. The NSCL 120 associated with the target G/D SCL 106/114 maintains a state for the QoS Resource associated with the target G/D SCL 106/114 and updates its information with the necessary association, once it receives the SIP INVITE 308, as shown in 264. In step 266, the G/D SCL 106/114 associated with remote monitoring or the ones that are expected to use QoS, will typically use the subscription feature to be notified of any such incoming requests.

In step 312, the G/D SCL 106/114 reads incoming information, including the QoS URL associated with the originating request and at this point is aware that there is a request for a dynamic QoS enabled data transfer. In 314 the G/D SCL 106/114 updates the NSCL 120 with its response. The terminating NSCL 120 now has all the information needed to update its internal state and can then finalize the setup of the IMS session through the sending of the SIP 200 OK, including the media description to the originating IMS side, via the terminating P-CSCF and terminating IMS nodes, where final media authorization is performed as shown in 316. In step 280 the SIP 200 OK is received by the S-CSCF in the originating IMS domain, which can then forward it to P-CSCF 136 as SIP 200 OK message 282. In step 284, final media authorization is performed again by the P-CSCF 136 to update the QoS policy and charging rules to be downloaded to the packet core nodes, illustrated as AAR 284*a* and AAA 284*b*. The originating NSCL 120 receives the SIP 200 OK response 286, and the accepted offer. The originating NSCL 120 can then update all its internal state and resources as shown in 288. In step 318 confirmation of the session with QoS information, or a QoS URL is provided to NA 122 in an HTTP 200 OK message. Data transfer 292 can then commence.

Figure 10:
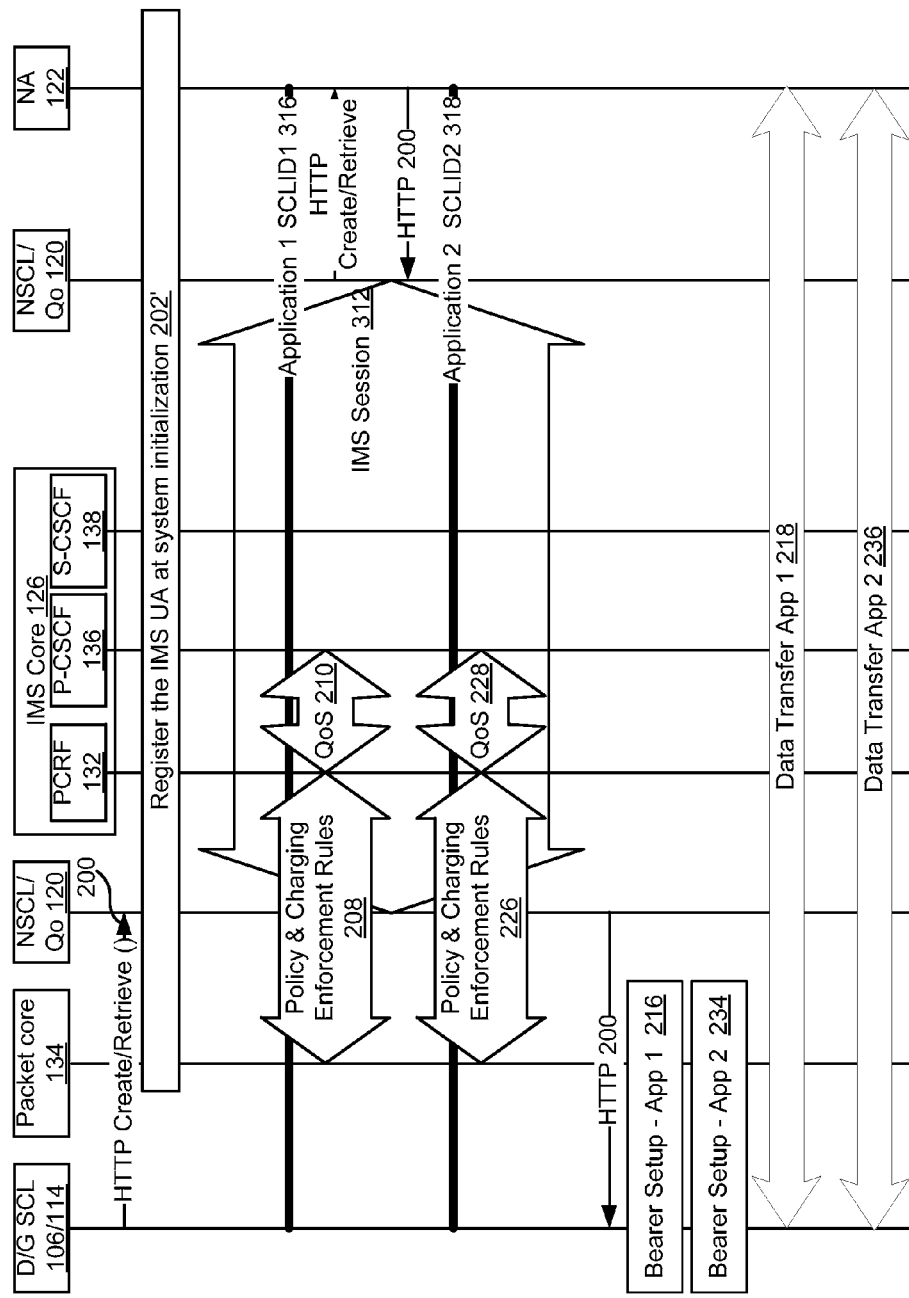
FIG. 10 illustrates a call flow of a method according to an embodiment of the present invention.

FIG. 10 illustrates a scenario in which the NSCL 120 ensures that regardless of how many applications the G/D SCL 106/114 interacts with, a single IMS session is used, or at most a limited number of IMS sessions are used, and where each IMS session handles a limited number of applications. The created IMS session can support multiple IP flows, one or more IP flow for each M2M application. In a presently preferred embodiment, each IP flow will be associated with a different port allowing each flow to be distinguished from the others. In this scenario, the application ID can be included at the Session Description Protocol (SDP) level and not at the session level as illustrated earlier The following is a brief description of the call flow. The G/D SCL 106/114 sends an HTTP CREATE request 200 to the NSCL 120 on behalf of the application. The NSCL 120 registers with the IMS core network if it had not already done so, and enables the IMS UA in step 202'. The NSCL 120 establishes an IMS session 312 if one is not available for use. If IMS session 312 has already been created, NSCL 120 modifies the session to add a new IP flow based on the changes to the media description from the previous one. The illustrated call flow shows two IP flows with different QoS profiles belonging to two different M2M applications resident on the same G/D SCL 106/114. In this exemplary embodiment, the application ID can be include at the media level and not the session level. The interaction between the IMS core 126 and the PCRF 132, as discussed above may be performed through an Rx interface, while the interaction between the PCRF 132 and the packet core network 134 for QoS enforcement is performed using a Gx interface. Note that in this exemplary embodiment there can be a separate QoS resource for IP flows of an M2M application. The NSCL 120 can also maintain a mapping between the IMS session, the QoS information and the parties (SCL IDs, Application ID, etc.) engaged in the flows for every M2M application, shown as flows 316 and 318. All these associations and bindings can be maintained in the QoS resource associated with IP flows per M2M application in the IMS session. NSCL 120 returns an HTTP 200 OK response to the G/D SCL 106/114. Each IP flow has a corresponding set of Policy & Charging Enforcement Rules and QoS agreements. IP flow 316 has Rules 208 and QoS 210 as described above, while IP flow 318 for application 2 has Rules 226 and QoS 228 as described above. At this point, a bearer 216 for application 1 and a bearer 234 for application 2 can be established as described above, and data transfers 218 and 236 can commence.

One skilled in the art will note that if the originating NSCL and destination NSCL are distinct nodes then there may be different QoS resource used in each NSCL per M2M application. This does not change any of the above basic principles with the only exception that the terminating node will be responsible for creating and maintaining the QoS resource used by the NA, while the originating NSCL is responsible for allocating and maintaining the QoS resource used by the D/G SCL. Those skilled in the art will appreciate that the remainder of this call flow will progress much along the lines as those above. As such, no further discussion is provided for the sake of brevity.

As stated before, the Rx interface can be used to obtain media authorization by the NSCL. One issue to highlight here is that the AA-Request, as shown below from the applicable 3GPP specification has the element "*[ Subscription-ID] Type=MSIDSN". Typically the M2M service provider may know the MSISDN and as such can include it there. There are other cases where the M2M device does not have at all an MSISDN allocated to it by the access network provider or the M2M SP does not know the MSISDN. In this case, it is possible to extend the definition of [Subscription-ID] to allow the M2M service provider (NSCL) to include the M2M device public external identifier, which is known to the NSCL. This allows the access network provider to locate the IMSI associated with the external identifier and as such the PCRF will have the proper information. The PCRF can fetch the IMSI associated with an external identifier from the subscriber profile through normal 3GPP Procedures which have to be extended to include such a capability.

```
<AA-Request> ::= < Diameter Header: 265, PXY >
  < Session-Id >      as per RFC 3558
  { Auth-Application-Id }        as per TS 29.214 - Rx application
  { Origin-Host }                as per RFC 3588 (FQDN of NSCL)
  { Origin-Realm }               as per RFC 3588
  { Destination-Realm }          as per RFC 3588
  [ Destination-Host ]           Diameter Server FQDN
  [ AF-Application-Identifier ]  M2M Application ID
  *[ Media-Component-Description] Describes the media
  [ Service-Info-Status ]        N/A
  [ AF-Charging-Identifier ]     M2M Subscription ID
  [ SIP-Forking-Indication ]     N/A
  *[ Specific-Action ]           N/A
  *[ Subscription-ID ]           Type = MSIDSN
  *[ Supported-Features ]        N/A
  [ Reservation-Priority ]       N/A
  [ Framed-IP-Address ]          IP address of the UE (M2M PoC
                                 (RFC 4005)
  [ Framed-IPv6-Prefix ]         IP address of the UE m2m2PoC
                                 (RFC 4005)
  [ Called-Station-ID ]          N/A- The PDN the user is connected to
  [ Service-URN ]                N/A
  [ Sponsored-Connectivity-Data ]   N/A
  [ MPS-Identifier ]             N/A
  [ Rx-Request-Type ]            N/A
  [ Origin-State-Id ]            as defined in RFC 3855
  *[ Proxy-Info ]                N/A
  *[ Route-Record ]              N/A
  *[ AVP ]                       N/A
```

Figure 11:
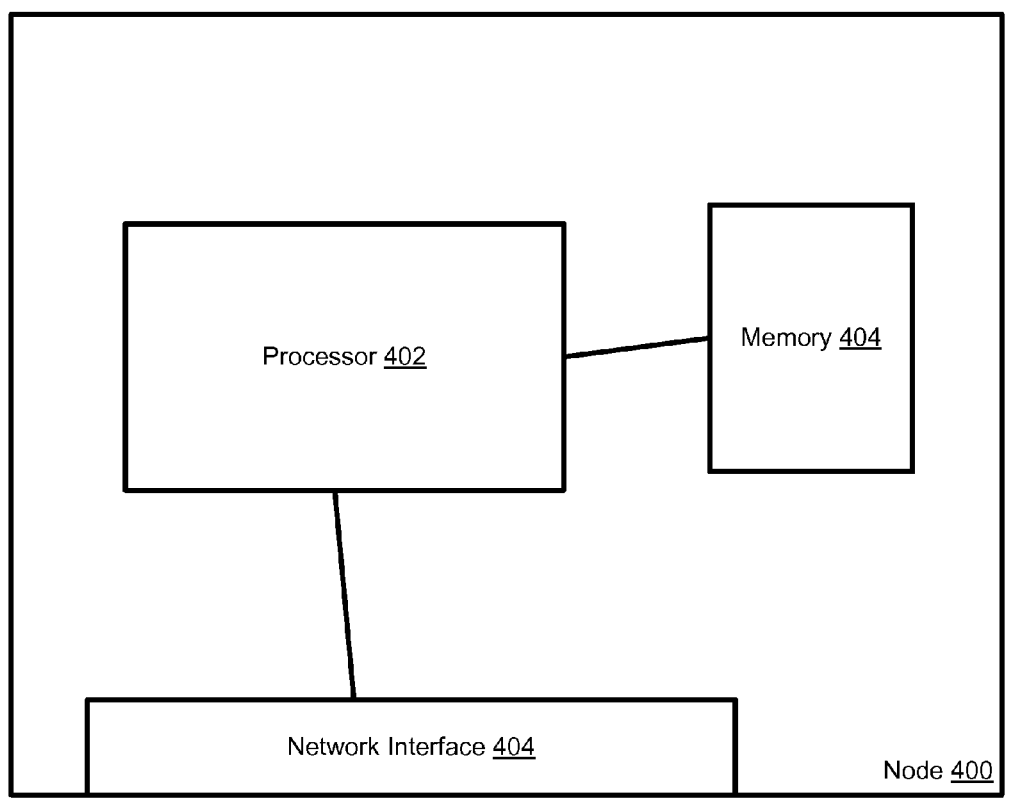
FIG. 11 is a block diagram that illustrates an exemplary node for carrying out the method discussed above.

FIG. 11 illustrates an exemplary node for carrying out the methods described above. Node 400 has a processor 402 and a network interface 404. When processor 402 executes instructions stored in memory 406, it can execute the necessary method steps to interact with other nodes reached through the network interface as described above with respect to FIG. 1-10.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto

What is claimed is:

1. A method of establishing a Quality of Service, QoS, session with a machine-to-machine, M2M, device to provide access to an associated service, the method being performed at a network application entity and comprising:
   obtaining a request to establish a QoS session with the M2M device, the request comprising a desired QoS for an associated service, the desired QoS indicating one or more QoS offer;
   determining an application server for handling the one or more QoS offer associated with the request;
   sending to the application server a second request comprising the one or more QoS offer;
   responsive to receiving a reply to the second request indicative that the application server will provide the associated service, the reply comprising an accepted QoS offer, sending a message for the M2M device in response to the request to establish the QoS session, the message comprising the accepted QoS offer; and
   establishing the QoS session with the M2M device in which the M2M device is provided with proxied access to the associated service provided by the application server so as to hide the application server from the M2M device.

2. The method of claim 1, wherein the message for the M2M device comprises the QoS Uniform Resource Locator, URL, associated with the network application entity.

3. The method of claim 1, wherein the request to establish the QoS session with the M2M device is received from a network service control layer, NSCL, entity associated with the network application.

4. The method of claim 3 wherein the NSCL entity is also associated with the M2M device.

5. The method of claim 3, wherein the M2M device is associated with another NSCL entity distinct from the NSCL associated with the network application entity.

6. The method of claim 5, wherein the another NSCL associated with the M2M device and the NSCL entity associated with the network application entity communicate with each other through an Internet Protocol Multimedia Service, IMS, core network.

7. The method of claim 1, wherein the step of obtaining further comprises:
   receiving a notification from a network service control layer, NSCL, entity in response to a previous subscription request from the network application entity, the notification indicating the request for the QoS session is available at the NSCL entity from the M2M device; and
   fetching from the NSCL entity the one or more QoS offer associated with the request.

8. The method of claim 7, wherein the fetching step comprises sending a HyperText Transfer Protocol, HTTP, Read request to the NSCL entity.

9. A network application server for establishing a Quality of Service, QoS session with a machine to machine, M2M, device, the network application server comprising:
- a network interface configured to communicate over a network with M2M devices;
- a processor configured to execute instructions; and
- a memory configured to store program executable instructions that when executed cause the processor to:
- obtain a request to establish a QoS session with the M2M device, the request comprising a desired QoS for an associated service, the desired QoS indicating one or more QoS offer;
- determine an application server to handle the one or more QoS offer associated with the request;
- send to the application server a second request comprising the one or more QoS offer;
- responsive to reception of a reply to the second request indicative that the application server will provide the associated service, the reply comprising an accepted QoS offer, send a message for the M2M device in response to the request to establish the QoS session, the message comprising the accepted QoS offer; and
- establish the QoS session with the M2M device in which the M2M device is provided with proxied access to the associated service provided by the application server so as to hide the application server from the M2M device.

\* \* \* \* \*